US008751799B2

(12) United States Patent
Tanenbaum et al.

(10) Patent No.: US 8,751,799 B2
(45) Date of Patent: Jun. 10, 2014

(54) METHOD AND APPARATUS FOR PROVIDING CONTENT

(75) Inventors: Mitchell J. Tanenbaum, Littleton, CO (US); Daniel L. Kruger, Evergreen, CO (US)

(73) Assignee: Absio Corporation, Highlands Ranch, CO (US)

( * ) Notice: Subject to any disclaimer, the term of this patent is extended or adjusted under 35 U.S.C. 154(b) by 161 days.

(21) Appl. No.: 13/092,758

(22) Filed: Apr. 22, 2011

(65) Prior Publication Data

US 2011/0289309 A1 Nov. 24, 2011

Related U.S. Application Data

(60) Provisional application No. 61/346,819, filed on May 20, 2010.

(51) Int. Cl.
*H04L 29/06* (2006.01)
*H04L 9/08* (2006.01)
*H04L 9/00* (2006.01)
*G06F 21/60* (2013.01)
*H04L 9/28* (2006.01)
*G06F 21/62* (2013.01)

(52) U.S. Cl.
CPC .............. *H04L 9/0825* (2013.01); *H04L 9/006* (2013.01); *H04L 9/0819* (2013.01); *H04L 9/28* (2013.01); *H04L 29/06659* (2013.01); *H04L 29/06666* (2013.01); *H04L 29/0668* (2013.01); *H04L 63/0428* (2013.01); *H04L 63/045* (2013.01); *G06F 21/60* (2013.01); *G06F 21/62* (2013.01); *G06F 2211/008* (2013.01); *G06Q 2220/10* (2013.01); *G06F 2220/16* (2013.01); *G06F 2220/18* (2013.01)
USPC ........... 713/165; 713/150; 713/151; 713/153; 713/167; 713/189; 713/193; 726/1; 726/2; 726/26; 726/27; 726/28; 726/29; 726/30; 726/31; 726/32; 726/33; 380/201; 380/203; 380/259; 380/277; 380/278; 380/285; 380/44; 380/28; 380/29; 380/30; 705/50; 705/51; 705/57; 705/59

(58) Field of Classification Search
CPC ........... H04L 9/006; H04L 9/008; H04L 9/06; H04L 9/08; H04L 9/14; H04L 9/18; H04L 9/28; H04L 9/30; H04L 12/40101; H04L 29/66; H04L 63/04; H04L 2209/60; H04L 2463/062; G06F 21/62; G06F 2211/007; G06F 2211/008; G06F 2212/402; G06F 2221/2107
USPC ........ 380/1–203, 259–263, 277–30; 726/1, 2, 726/26–33; 713/150–153, 160–167, 713/189–194; 705/50–59
See application file for complete search history.

(56) References Cited

U.S. PATENT DOCUMENTS 5,960,086 A 9/1999 Atalla
6,088,449 A 7/2000 Atalla
(Continued)

OTHER PUBLICATIONS

Privacy in Encrypted Content Distribution Using Private Broadcast Encryption by Barth et al; Publisher: Springer-Verlag; Year: 2006.*

(Continued)

*Primary Examiner* — Madhuri Herzog
(74) *Attorney, Agent, or Firm* — Sheridan Ross P.C.

(57) ABSTRACT

Methods and systems for enabling content to be securely and conveniently distributed to authorized users are provided. More particularly, content is maintained in encrypted form on sending and receiving devices, and during transport. In addition, policies related to the use of, access to, and distribution of content can be enforced. Features are also provided for controlling the release of information related to users. The distribution and control of contents can be performed in association with a client application that presents content and that manages keys.

20 Claims, 20 Drawing Sheets

(56) References Cited

U.S. PATENT DOCUMENTS

| | | | |
|---|---|---|---|
| 6,874,085 B1 * | 3/2005 | Koo et al. ................ 713/165 |
| 6,912,655 B1 | 6/2005 | Zucker | |
| 7,257,706 B1 | 8/2007 | Zucker | |
| 7,343,495 B2 * | 3/2008 | Kambayashi et al. ........ 713/193 |
| 7,386,891 B2 * | 6/2008 | Peinado ................ 726/26 |
| 7,484,245 B1 * | 1/2009 | Friedman et al. ............. 726/27 |
| 7,639,805 B2 * | 12/2009 | Li et al. ................ 380/201 |
| 7,743,249 B1 | 6/2010 | Zucker et al. | |
| 2002/0026582 A1 | 2/2002 | Futamura et al. | |
| 2003/0120611 A1 * | 6/2003 | Yoshino et al. ............. 705/67 |
| 2005/0021941 A1 * | 1/2005 | Ohmori et al. ............. 713/156 |
| 2005/0044016 A1 | 2/2005 | Irwin et al. | |
| 2005/0100161 A1 | 5/2005 | Husemann et al. | |
| 2005/0131832 A1 | 6/2005 | Fransdonk | |
| 2006/0107285 A1 | 5/2006 | Medvinsky | |
| 2007/0198413 A1 | 8/2007 | Nagao | |
| 2008/0131861 A1 | 6/2008 | Redd et al. | |
| 2009/0276829 A1 | 11/2009 | Sela et al. | |
| 2011/0069836 A1 * | 3/2011 | Rae et al. ................ 380/259 |

OTHER PUBLICATIONS

Notification of Transmittal of the International Search Report and the Written Opinion of the International Search Authority for International Application No. PCT/US11/36368, mailed Aug. 30, 2011, 8 pages.

International Preliminary Report on Patentability for International Patent Application No. PCT/US2011/036368 mailed Nov. 29, 2012, 7 pages.

* cited by examiner

METHOD AND APPARATUS FOR PROVIDING CONTENT

CROSS-REFERENCE TO RELATED APPLICATIONS

This application claims the benefit of U.S. Provisional Patent Application Ser. No. 61/346,819, filed May 20, 2010, the entire disclosure of which is hereby incorporated herein by reference.

COPYRIGHT AUTHORIZATION

A portion of the disclosure of this patent document contains material that is subject to copyright protection. The copyright owner has no objection to the facsimile reproduction by anyone of the patent disclosure, as it appears in the Patent and Trademark Office patent file or records, but otherwise reserves all copyright rights whatsoever.

FIELD

Methods and apparatuses for providing content are provided. More particularly, methods and systems for enabling content to be securely provided over communication networks are provided.

BACKGROUND

The Internet increasingly provides the means by which content is distributed. However, the Internet is inherently insecure. As a result, it has been difficult for content providers to realize compensation for content distributed over the Internet, particularly using the applications and services running on the Internet collectively known as the World Wide Web, or simply "the Web". For example, although publishers, including traditional newspaper publishers, have constructed pay walls, which typically require payment of subscription fees to access content, such walls can usually be circumvented without great difficulty. Moreover, because authorized users can easily make and distribute content that is legitimately accessed, illicit copies made from legitimate copies are commonly available. Therefore, with some exceptions, traditional publishers have been largely unsuccessful at realizing compensation in connection with content that is made available over the Internet.

As alternatives to subscription arrangements, other mechanisms for monetizing the provision of content have been developed. For example, advertising supported content is commonly available on the Internet. One difficulty with advertising supported content has been assigning a value to advertisements associated with content. For example, advertisements are preferably directed to persons who are likely buyers of advertised goods and services. However, accurately targeting consumers of advertised goods and services requires information about their needs and desires. This information can be inferred from search terms entered by the user and/or from content viewed by the user. Internet service providers can also analyze subscriber emails to create profiles that can be sold to advertisers or otherwise used in targeting consumers. Moreover, search terms, viewed content, and other data indicative of a user's needs or wants can be accumulated over time by advertisers or associated entities. However, such use of private information is often considered objectionable.

In order to provide privacy and security for Internet activities, various security applications and procedures can be applied. However, the use of security applications is optional, and is not pervasive on the Web. In addition, security is typically implemented using an insufficient number of keys, with the result that cracking one key can often lead to access to large amounts of data. In addition, even when encryption has been applied, such encryption has been isolated. For example, data is frequently stored in unencrypted form both in the cloud and on the computers of end users. In addition, the application of security features, for example to prevent or limit the release of private information, can make many features of the Web inaccessible, because operation of such features is predicated on free access to information. Therefore, the relative lack of privacy and security on the Internet remains a problem, and has adversely affected the electronic distribution of content.

SUMMARY

Embodiments of the present invention are directed to providing methods and systems for enabling content to be securely and conveniently distributed to authorized users, even over insecure networks. In accordance with embodiments of the present invention, a client application is provided for managing the collection of content and keys required to access that content. In accordance with further embodiments of the present invention, the client application participates in implementing access controls related to items of content. These controls enable content providers to condition access to content on receiving consideration for such access and/or to enforce other policies related to the use of and access to content. Moreover, embodiments of the present invention allow different levels of access to content to be provided to different users, and further allow content to be made available for different users on different terms.

A system in accordance with embodiments of the present invention includes server side components connected to client devices via a communication network, such as the Internet. The server side components can include storage devices on which content is stored. The system can include agents or modules for performing various functions, including synchronization, content management, authentication, match making, taxonomy, billing, and other functions. The client devices included in the system feature a client application. The client application provides an interface through which a user accesses available content. Moreover, the client application maintains metadata concerning content objects, information for fetching or updating content or other information to the user, including targeted advertising. In one aspect, the client application maintains and manages one or more key rings containing keys for enabling access to encrypted content.

Methods in accordance with embodiments of the present invention include the delivery of content to recipient client devices in encrypted form. More particularly, when a user composes a document or other content, a new encryption key, in particular a content key, is applied to encrypt that document. The document is then stored on the client device of the author in encrypted form. In addition, metadata related to the document can be encrypted using the content encryption key. If the author decides to provide the content to another user, the encrypted or unencrypted header and metadata information associated with the document can be encrypted using a permissions key. Next, the recipients of the document are identified, and a public key for the recipient is requested. The permissions key and the content key are then encrypted by the public key of the recipient. The recipient is then provided with a copy of the document package, including the encrypted content, the encrypted content key, metadata related to the content, and the associated content and permissions keys. Where the content is provided to multiple recipients, a separate document package is created for each recipient, with each individual document package having elements encrypted using the recipient's public key.

Upon receipt at the client device of the content, the recipient's private key is applied to remove the delivered data from the wrapper created using the recipient's public key. The encrypted document is stored in the object store on the client device. More particularly, a container that contains the encrypted content, metadata, and a permissions key for content is stored in the object store. The content key is added to the key ring maintained by the client application on the client device. This key ring can be associated with a particular collection of data objects, also referred to herein as a concert. Accordingly, it can be appreciated that content is delivered to client devices in encrypted form. In addition, it can be appreciated that content is stored on client devices in encrypted form. In accordance with further embodiments of the present invention, a user of a client device has no direct access to the key ring associated with the encrypted content or the individual keys of that key ring. Instead, access to the keys of a key ring can only be made through a client application that holds the user's private key. Direct access to the private key is prevented by the client application and by client side system keys. Accordingly, policies established by authors and/or publishers regarding encrypted content can be enforced, including policies that prevent or restrict uncompensated distribution of the content.

In order to access content included in a concert on a client device, the client application applies a client side system key for the subject concert to access the required content key stored as part of that concert's key ring. The client side system key can be a symmetric key that is protected with the user's private key. Moreover, the user need not be cognizant of the client side system keys used to access that user's concert key rings. The content key can then be applied by the client application to decrypt the content and any header information or other metadata that was also encrypted using the content key. The encrypted content and other information can then be displayed to the user of the client device through the client application. Although the user of a client device can enable the content key, the user has no direct access to that key. In addition, the user is not required to manage content keys.

In accordance with still other aspects of embodiments of the present invention, at least some portion of the content or metadata related to the content may be available in unencrypted form. For example, metadata comprising a synopsis of a document or other content and information identifying the author and/or publisher of the document can be made publicly available. Even data that is publicly available can be stored in encrypted form using a key that is well known to the system. If, after viewing the publicly available information, a person is interested in obtaining a complete copy of the document, that person can arrange for appropriate payment or other consideration, and in return receive access rights to that content.

Additional advantages and features of embodiments of the present invention will become more readily apparent from the following description, particularly when taken together with the accompanying drawings.

DETAILED DESCRIPTION

Figure 1:
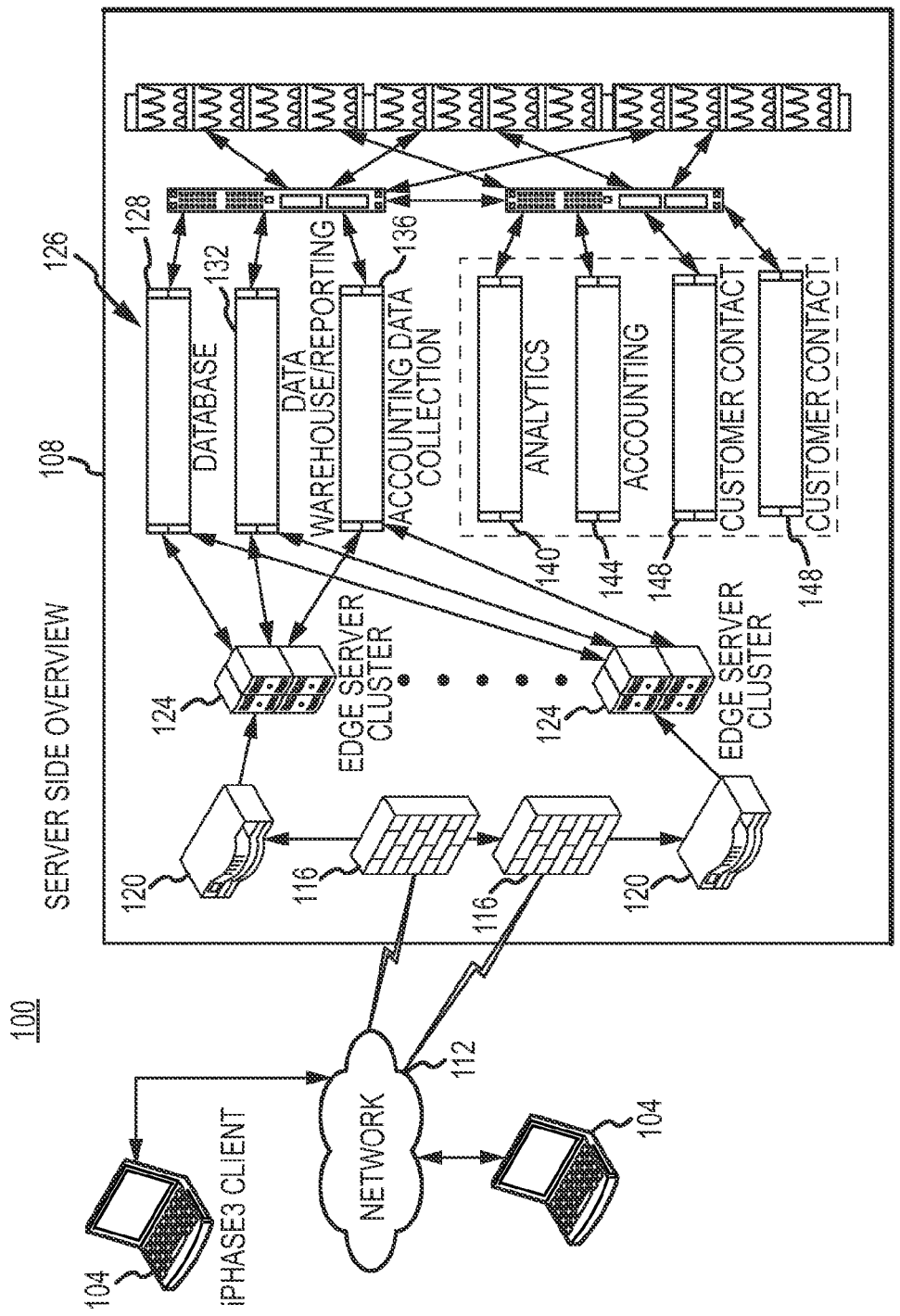
FIG. 1 depicts elements of a system for providing content in accordance with embodiments of the present invention.

FIG. 1 illustrates aspects of a system 100 for providing content in accordance with embodiments of the present invention. In general, the system 100 includes one or more client devices 104 interconnected to a content system server 108 by a communication network 112. A client device 104, as will be described in greater detail elsewhere herein, may comprise a general purpose computer, such as, but not limited to, a laptop or desktop personal computer. The communication network 112 may comprise one or more networks, including the Internet. The content system server 108 may comprise one or more devices that perform functions in support of the provision of content to client devices 104 over the communication network 112.

More particularly, a content system server 108 in accordance with embodiments of the present invention can include one or more firewalls 116, gateways 120, edge server clusters 124 and core servers 126. An edge server cluster 124 and/or core server 126 provided as part of a content system server 108 can include one or more databases 128, data warehouse/reporting engines or modules 132, and accounting data collection engines or modules 136. The content system server 108 can additionally include analytics 140, accounting 144, and customer contact 148 engines or modules. Although the various components of the content system server 108 are depicted in FIG. 1 as discrete pieces of interconnected hardware, it should be appreciated that embodiments of the present invention are not limited to such configurations. For example, a content system server 108 can be implemented using one or a small number of server computer devices. A content system server 108 can also be distributed among a number of different devices, various functions performed by the content system server 108 can be distributed among such devices, and the devices making up the content system server 108 can be distributed among different locations.

Figure 2:
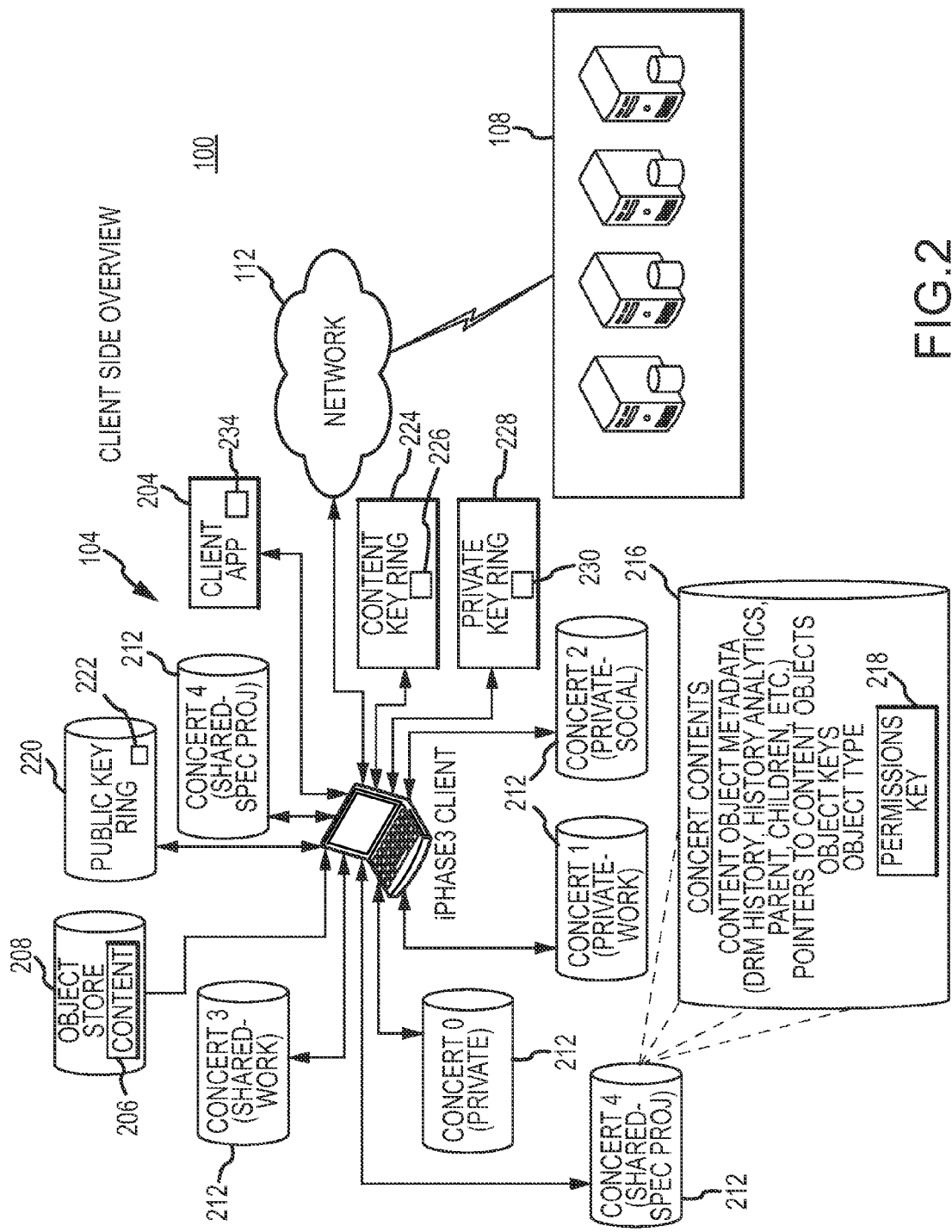
FIG. 2 depicts other elements of a system for providing content in accordance with embodiments of the present invention.

FIG. 2 illustrates another view the content distribution system 100 in accordance with embodiments of the present invention, and in particular illustrates additional aspects of the client device 104. The client device 104 executes a client application or concert application 204. The client application 204 can function to retrieve content from the content system server 108 via the communication network 112, to enable access to that content, and to enforce rules associated with that content. The client application 204 can also function to prepare content for delivery from the client device 104 to other client devices 104 and/or the content system server 108. The client application 204 can also control the collection and release of information, such as demographic information regarding a user associated with the client device 104, interests of the user associated with the client device 104 or other personal information. In accordance with embodiments of the present invention, content can be maintained in an object store 208 on or associated with the client device 104. Moreover, in accordance with embodiments of the present invention, and as will be described in greater detail elsewhere herein, content 206 is stored in the object store 208 in encrypted form. Content 206 can be maintained in the object store 208 as part of one or more groupings, referred to herein as concerts 212. Moreover, access to content 206 can be through an associated concert 212. Each concert 212 can include various information or concert content 216, such as content object metadata (e.g., digital rights management (DRM) information, history, analytics, identities of parent objects, child objects, etc.), pointers to content objects, permission keys 218, object keys, and object type information. Each concert 212 is also associated with an access key, which can be in the form of a client side system key 234. In addition, different concerts 212 can access or share the same items of content 206.

The client device 104 also includes a public key ring 220, one or more content (concert) key rings 224, and a private key ring 228. The public key ring 220 can maintain public keys or encryption keys 222 that the client device 104 uses to encrypt information to be sent to other client devices 104 or to a content system server 108. The public keys 222 can be distributed by the content system server 108 to a client device 104 when requested by the client device 104. The content key ring 224 can be encrypted, and can comprise access or content keys 226 for decrypting items of content 206 maintained in the object store 208. Where there are multiple content key rings 224 associated with a client device 104, the different content key rings 224 can comprise concert key rings that are grouped according to the concert 212 to which they pertain. The private key ring 228 can include the private keys 230 needed to decrypt messages sent to the client device 104 using the corresponding public keys. In accordance with embodiments of the present invention, the user of the client device 104 does not have direct access to the content keys 226 maintained in the content key ring 224 or the private keys 230 maintained in the private key ring 228. Instead, the content key ring 224 and the private key ring 228 are encrypted and accessed using hidden or system keys 234 that only the client application 204 can access. Therefore, access to the content 224 and private 228 key rings must be made through the client application 204, allowing policies regarding distribution and/or use of content 206 established by an author, publisher, or other authority to be enforced. Moreover, the client side system key may be a symmetric key that is protected by the user's private key.

Figure 3:
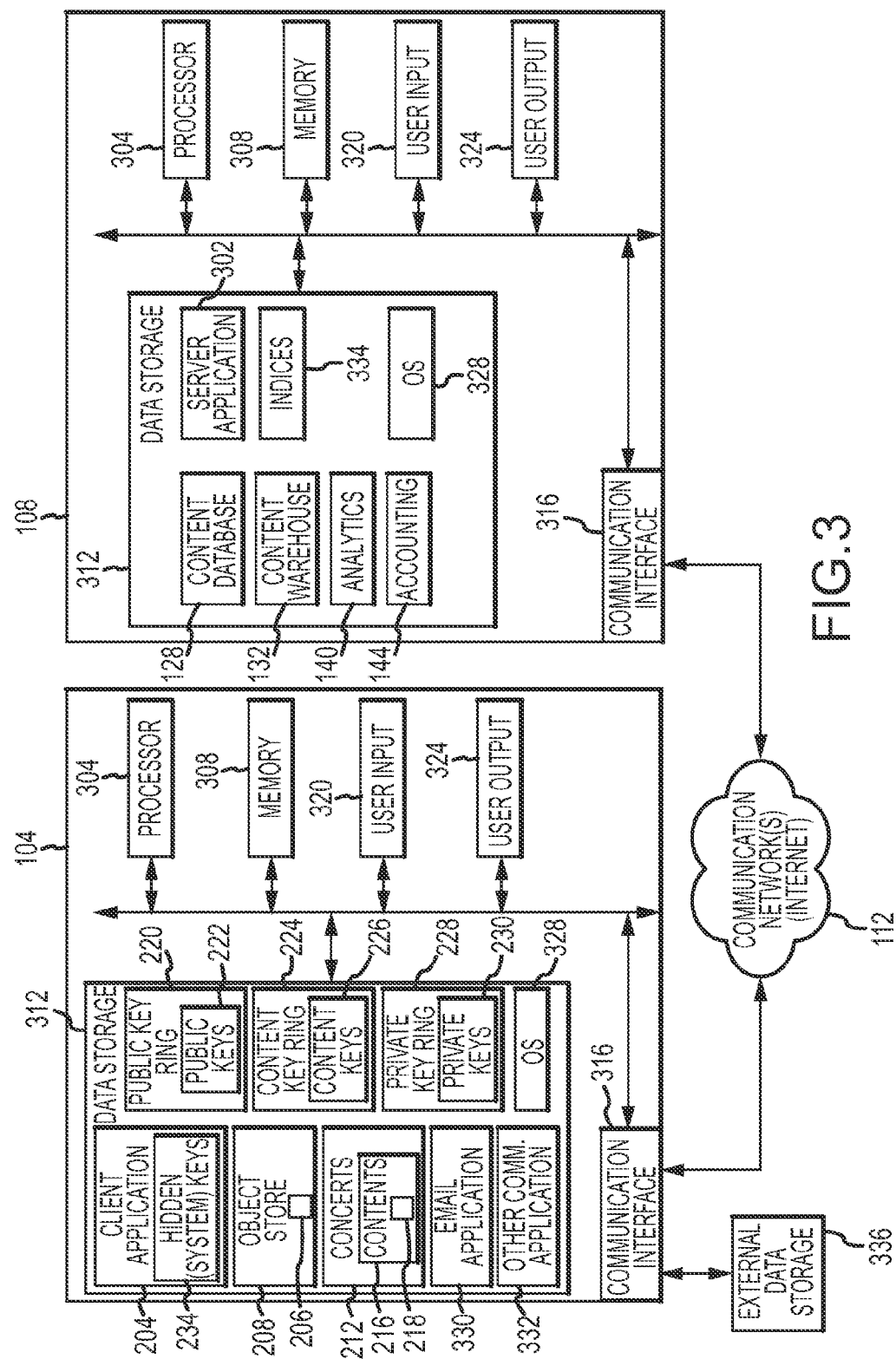
FIG. 3 is a block diagram depicting components of a system for providing content in accordance with embodiments of the present invention.

FIG. 3 is a block diagram depicting components of a system 100 for providing content in accordance with embodiments of the present invention. More particularly, additional components of the client device 104 and content system server 108 are illustrated. In general, the client device 104 can comprise a general purpose computer, smart phone, or other device capable of supporting communications over a communication network 112, and of running a suitable version of the client application 204. The server system 108 may comprise one or more server computers capable of communication over a communication network 112, and of running a suitable server application 302. In general, the client device 104 and server system 108 include a processor 304, memory 308, data storage 312, and a communication or network interface 316. In addition, the client device 104 and/or server system 108 can include one or more user input devices 320, such as a keyboard and a pointing device, and one or more user output devices 324, such as a display and a speaker.

The processor 304 may include any processor capable of performing instructions encoded in software or firmware. In accordance with other embodiments of the present invention, the processor 304 may comprise a controller or application specific integrated circuit (ASIC) having or capable of performing instructions encoded in logic circuits. The memory 308 may be used to store programs or data, including data comprising content 206. As examples, the memory 308 may comprise RAM, SDRAM, or other solid state memory. Alternatively or in addition, data storage 312 may be provided. The data storage 312 may generally include storage for programs and data. For example, the data storage 312 may store various data and applications. For instance, with respect to a client device 104, data storage 312 may provide storage for a client application 204, object store 208, concerts 212 and concert contents 216, and the public key ring 220. Data storage 312 associated with a client device 104 can also provide storage for a content key ring 224 and the private key ring 228 for the client device 104. In addition, operating system 328 instructions, an email application 330, other communication applications 332, or other applications and data can be stored in data storage 312. The data storage 312 associated with the server system 108 can include the content database 128, data warehouse 132, analytics information 140, accounting information 144, and various indices 334, for example for use in connection with the storage and organization of content 206, user information, and other information. Instructions related to the server system 108 operating system 328 may also be stored in data storage 312 of the server system 108.

Data storage 312 may comprise fixed data storage, such as one or more internal hard disk drives, or logical partitions. In accordance with still other embodiments, external data storage 336 can be interconnected to the client device 104, for example via a communication interface 316. The external data storage 336 can provide data storage for some or all of the system 100 applications and data associated with a particular user. Accordingly, external data storage 336 can provide for storage of a client application 204, object store 208, concerts 212 and concert contents 216, key rings 220, 224, 228 and/or any other applications or data. Particular examples of external data storage 336 include external hard disk drives, universal serial bus (USB) drives, including flash drives, or other external data storage or memory devices.

Figure 4:
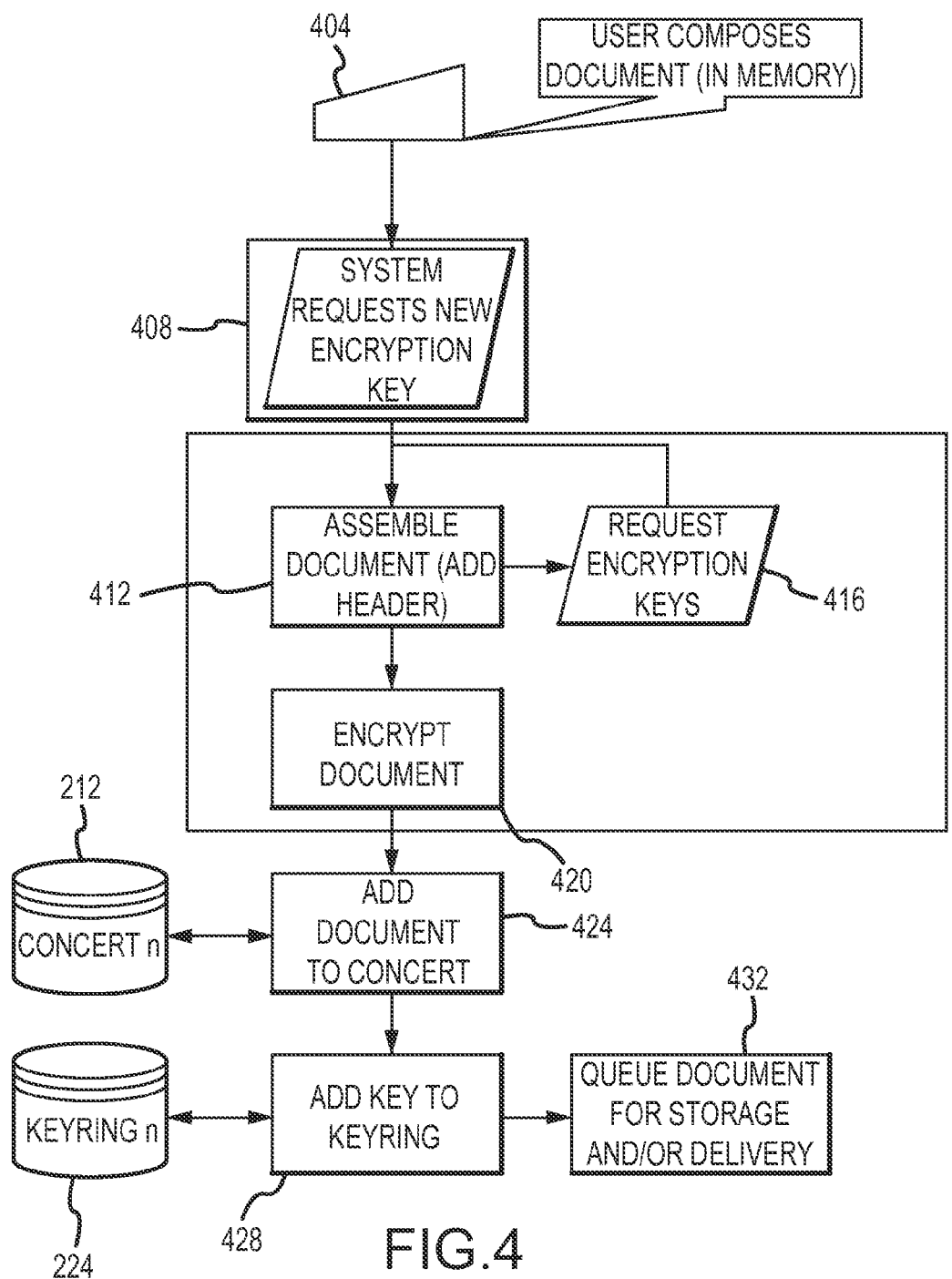
FIG. 4 illustrates aspects of a process for composing a document in accordance with embodiments of the present invention.

FIG. 4 is a flowchart depicting aspects of a process for composing content 206, in this example a document, in accordance with embodiments of the present invention. At step 404, a user, for example a user of a client device 104, composes a document or other content 206. When the content is ready for sending or is at least partially created, a new content encryption key 226 is requested (step 408). At step 412, the document is assembled. Assembly of the document can include associating header information with the document. In accordance with embodiments of the present invention, some of the header information can be encrypted along with the contents of the document, while other portions of the header data will not be encrypted using the content key 226 that is applied to the document contents. If the document will be sent to other users, public encryption keys 222 for those other users are requested (step 416). After obtaining the required key or keys 222 or 226, the document is encrypted (step 420).

At step 424, the created document is added to a concert 212. In particular, content object metadata is added to the concert or concerts 212 to which the document is assigned. In addition, the content key 226 requested at step 408 is added to the content key ring 224 of the user (step 428). At step 432, the encrypted document is queued for storage and/or delivery. In accordance with embodiments of the present invention, documents and other content are stored in an object store 208 in encrypted form. Therefore, storage can include storing the document, as encrypted using the content key 226, on data storage 312 associated with the client device 104. As described in greater detail elsewhere herein, for a document that is to be sent to another client device 104 or a server device 108, the content key 226 is encrypted using the recipient's public key 230. A document package comprising the encrypted content 206, the encrypted content key 226, and header or other information (which can be encrypted using the public key 230 of a user of the recipient device 104 and/or 108), metadata associated with the document (either unencrypted or encrypted with a permissions key 218 and/or the content key 226), the permissions key 218, and the encrypted content key 226 can then be delivered to a recipient device, for example across a public network.

Figure 5:
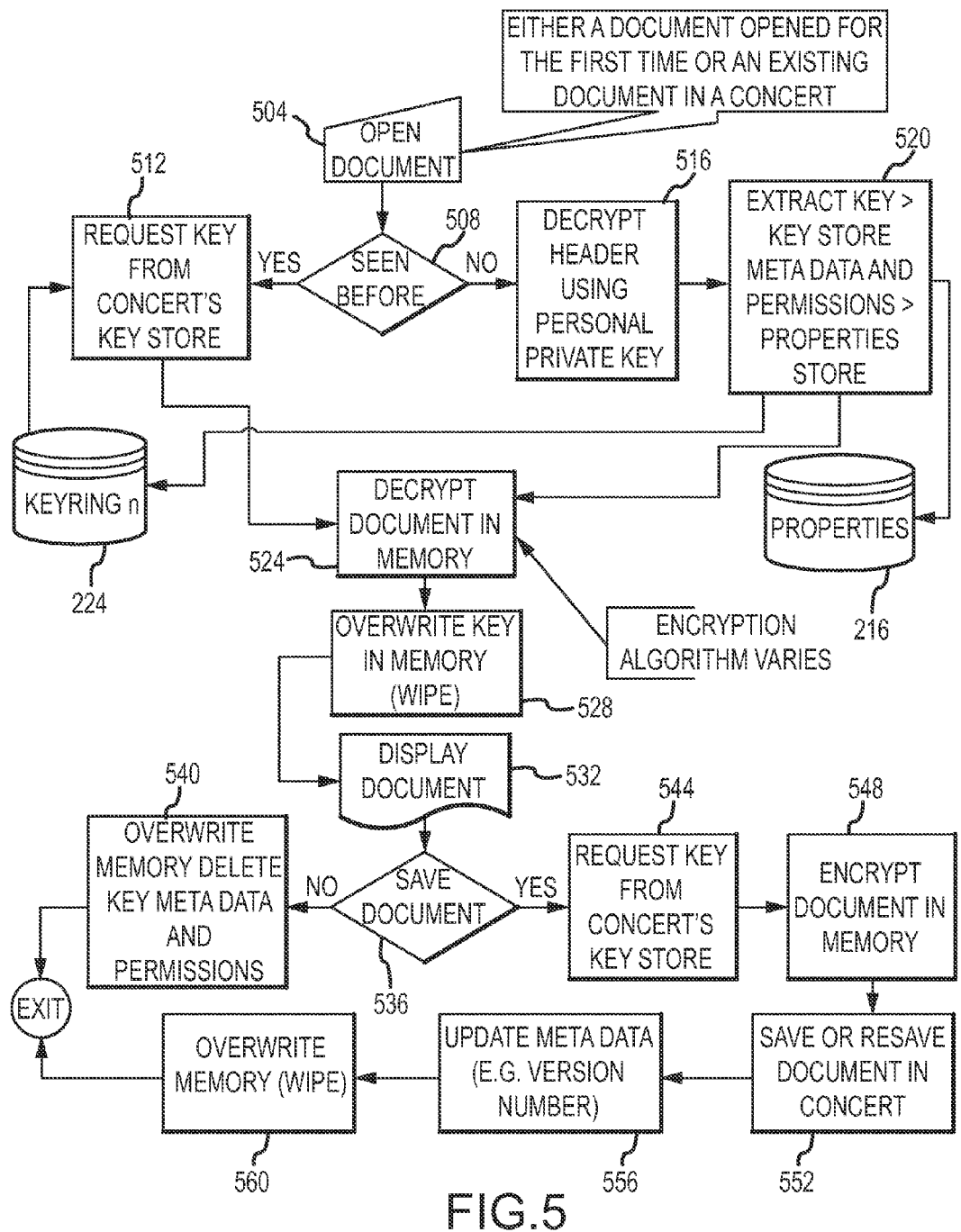
FIG. 5 illustrates aspects of a process for reading a document in accordance with embodiments of the present invention.

FIG. 5 illustrates aspects of a process for reading a document or other content 206 in accordance with embodiments of the present invention. Initially, at step 504, an instruction to open the document is received. The document that is opened can be a document that is opened for the first time, or an existing document in a concert 212 on the client device 104 being used to open the document that has previously been accessed. At step 508, a determination is made as to whether the document has been seen before. If it has been seen before, the client application 204 requests the content key 226 for that document from the content key ring 224 for the concert 212 that includes the document (step 512). In particular, for a document that has been seen before, decryption of content on the client device 104 includes the client application 204 applying the user's private key 230 to access a permissions key 218, which in turn enables access to the required content key 226 included in the content key ring 224. If the document has not been seen before, the accessible information is decrypted using the user's private key 222 (step 516). The content key 226 for the document is extracted by the client application 204 and is added to the content key ring 224, and metadata and permissions (as established by the associated permissions key 218) are stored in the content properties store included as part of the concert information 216 (step 520). Accordingly, whether extracting the content key 226 from the header or obtaining the content key 226 from the content key ring 224, the client application 204 can be required to apply the user's private key 230. After extracting the content key 226 from document header information, or after obtaining the content key 226 from the content key ring 224, the client application applies the required content decryption key 226 to decrypt the document in memory (step 524). Following decryption, the content key 226 in memory is overwritten (step 528), and the document is displayed by the client application 204 (step 532). Because access and display of the document is through the client application 204, actions that the user can take with respect to the document can be limited as determined by permissions associated with the document.

At step 536, a determination is made as to whether the document is to be saved. If the document is not to be saved, the memory is overwritten, the content key 226 is deleted from the content key ring 224, and metadata and permissions associated with that content 206 are deleted from the concert contents or properties store 216, and any other concert object metadata related to the document is deleted (step 540). If the document is to be saved, the content key 226 for the document is requested from the content key ring 224 (step 544) and the document is encrypted in memory (step 548). The encrypted document is then saved or resaved in the object store 208 (step 552). At step 556, metadata related to the document is updated. The memory is then overwritten, to remove any unencrypted versions or portions of the document from the memory (step 560).

Figure 6:
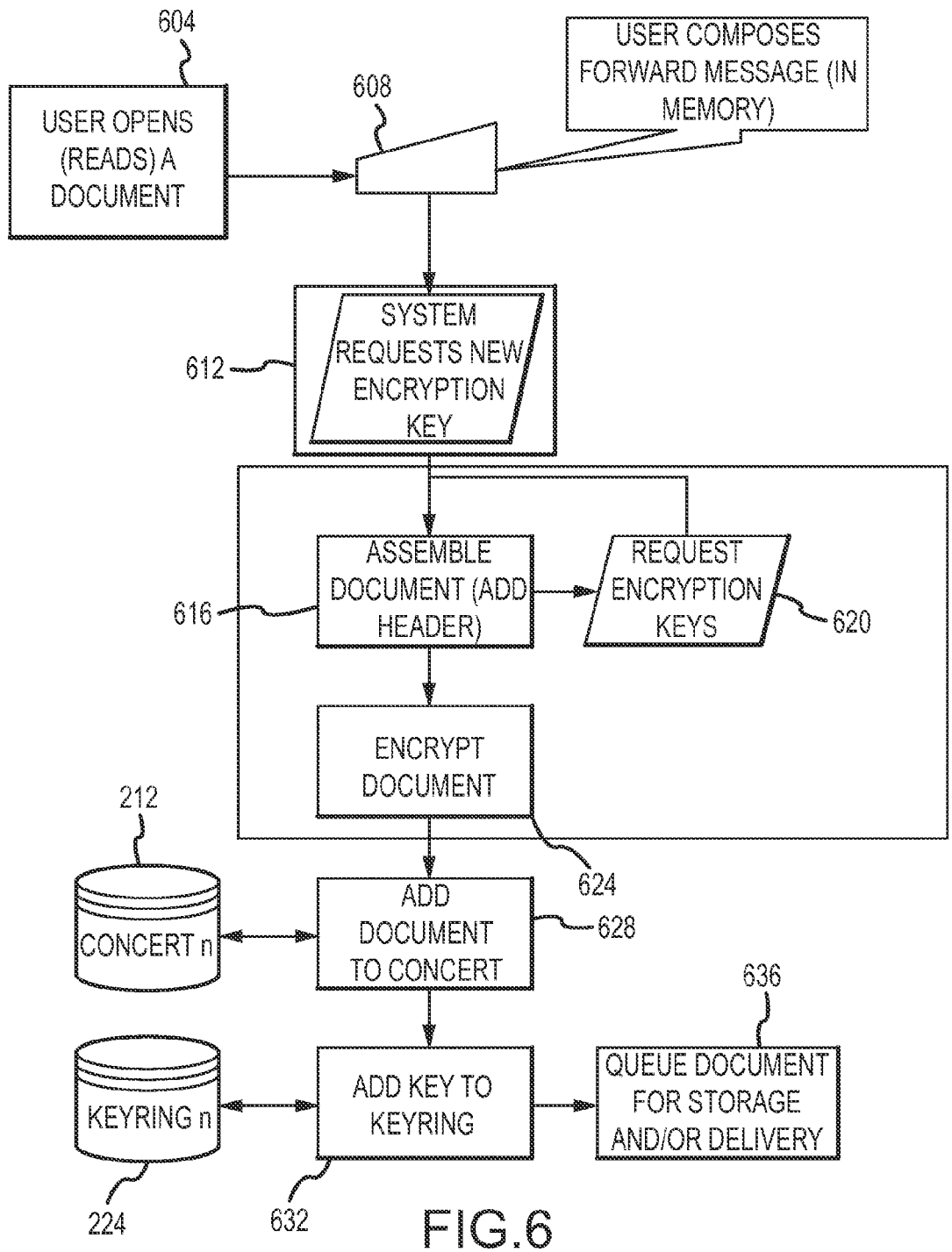
FIG. 6 illustrates aspects of a process for forwarding a document in accordance with embodiments of the present invention.

FIG. 6 illustrates aspects of a process for forwarding a document or other content 206 in accordance with embodiments of the present invention. Initially, at step 604, the user opens (reads) a document using a client device 104, for example as described in connection with FIG. 5. At step 608, the user composes a forward message in memory. In preparation for sending the message, the client application 204 running on the client device 104 requests a new content encryption key 226 (step 612). The document is assembled (step 616), and public encryption keys 222 for the recipient or recipients are requested (step 620). The document is next encrypted (step 624), and is added to the concert or concerts 212 to which the document is assigned (step 628). At step 632, the content key 226 is added to the content key ring 224 of the user. The encrypted document is then queued for storage and/or delivery (step 636).

Figure 7:
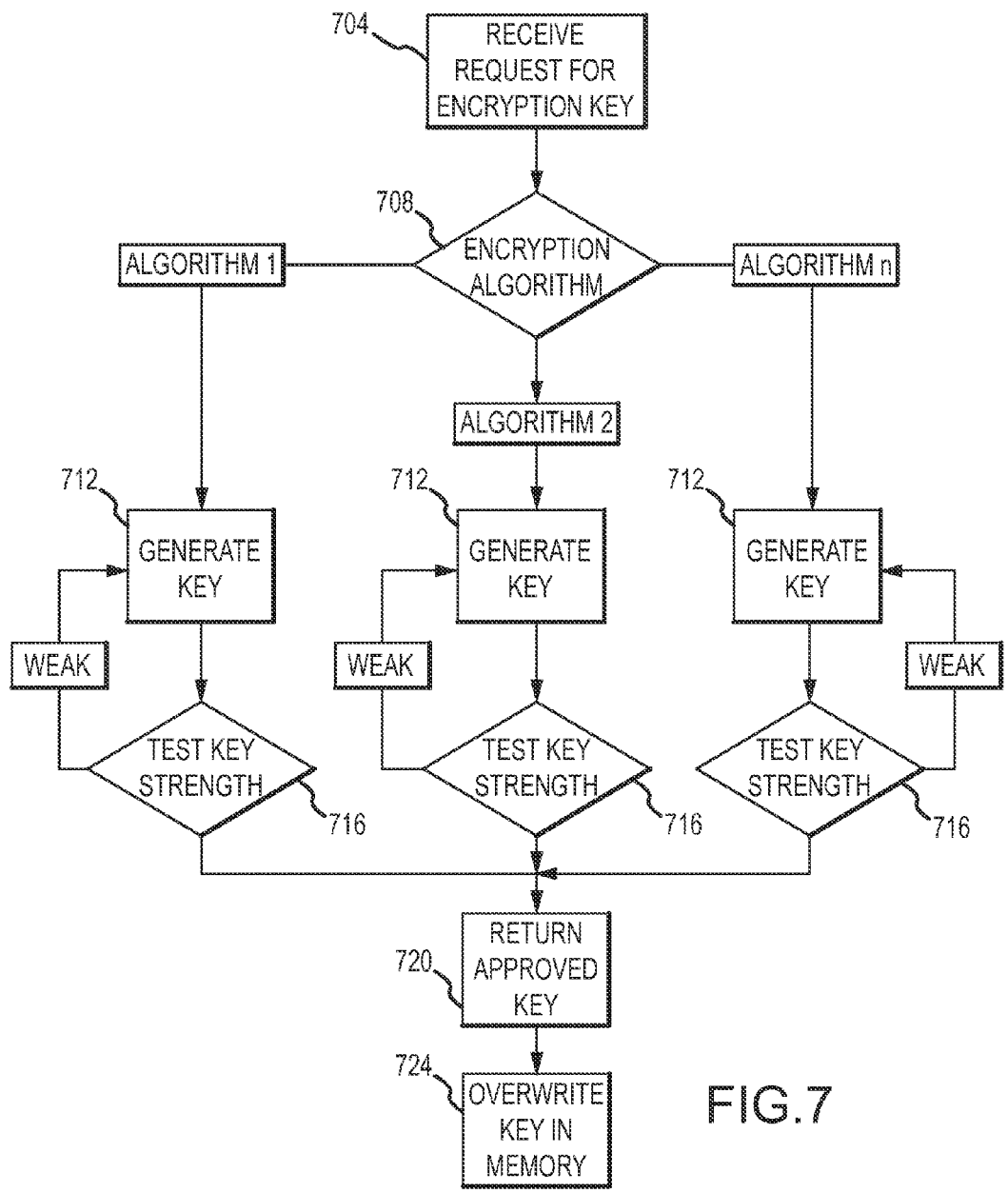
FIG. 7 illustrates aspects of a process for requesting an encryption key in accordance with embodiments of the present invention.

FIG. 7 illustrates aspects of a process for requesting a content encryption key 226 in accordance with embodiments of the present invention. In response to a request for a content encryption key 226 (step 704), an encryption algorithm is selected (step 708). As can be appreciated by one of skill in the art, some encryption algorithms are more suited to particular types of encrypted content than others. In addition, different encryption algorithms may be selected based on the level of security deemed necessary for the content 206 being encrypted. In view of these various considerations, embodiments of the present invention support multiple encryption algorithms. After an algorithm is selected, a content key 226 is generated (step 712) and the strength of that key 226 is tested (step 716). If the content key 226 is determined to be weak, a new content key 226 is generated (step 712), and that new key 226 is again tested (step 716). Once an approved key 226 has been generated, it is returned to the client application 204 (step 720). Returning the approved key (step 712) can include placing the content key 226 one of the key rings on the client device 104. The version of the content key 226 in memory is then overwritten (step 716).

Figure 8:
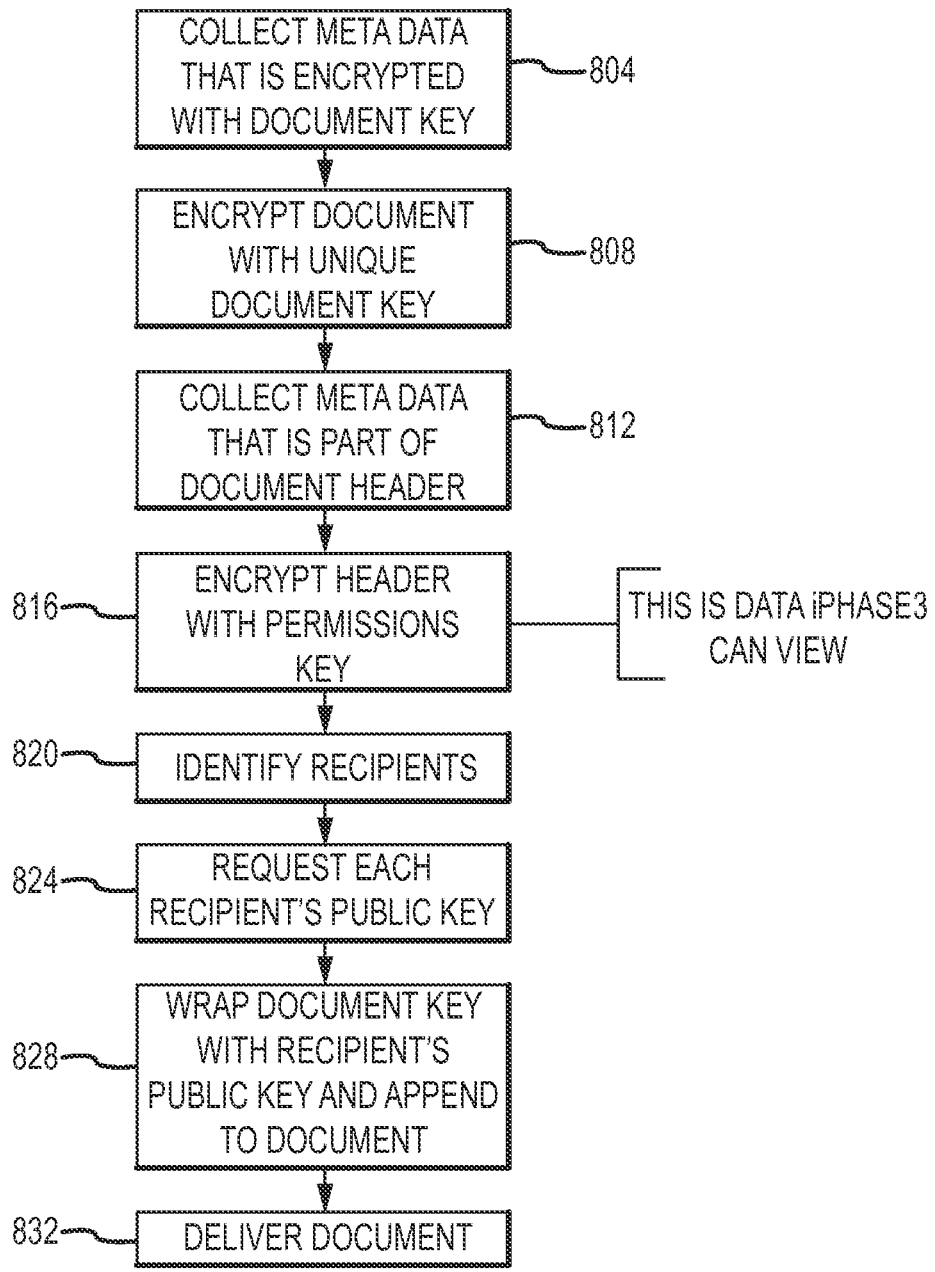
FIG. 8 illustrates aspects of a process for assembling a document in accordance with embodiments of the present invention.

FIG. 8 illustrates aspects of a process for assembling a document or other content 206 in accordance with embodiments of the present invention. At step 804, metadata that is to be encrypted with a document or content key 226 is collected. Metadata for encryption can include, for example, citations, or metadata that is not required until the document is actually viewed, such as information relating to the resolution of graphical elements of the document. At step 808, the document and related metadata is encrypted using the unique content key 226. At step 812, metadata that is part of the document header but that may not be encrypted using the content key 226 is collected. Examples of metadata that may not be encrypted can include a synopsis that the author or other authority desires to make public, the author, size of the document, creation date, etc. The header for the document, including the content key 226 required to access the document, is then encrypted with a permissions key 218 (step 816). At this point, the document and the associated information can be sent to the content system server 108.

At step 820, recipients of the document are identified, and the content system server 108 can request the public key 222 for each recipient of the document (step 824). The header information which has been encrypted using the appropriate permissions key 218, and the document or content key 226, is then wrapped with the recipient's public key 222 and appended to the encrypted document (step 828). The document is then delivered to the recipient client device 104 (step 832). Accordingly, a holder of the private key that is the pair to the public key 222 can access the header information, and can access the content key 226 by applying an appropriate private key 230, but can only perform actions enabled by the permissions key 218.

Figure 9:
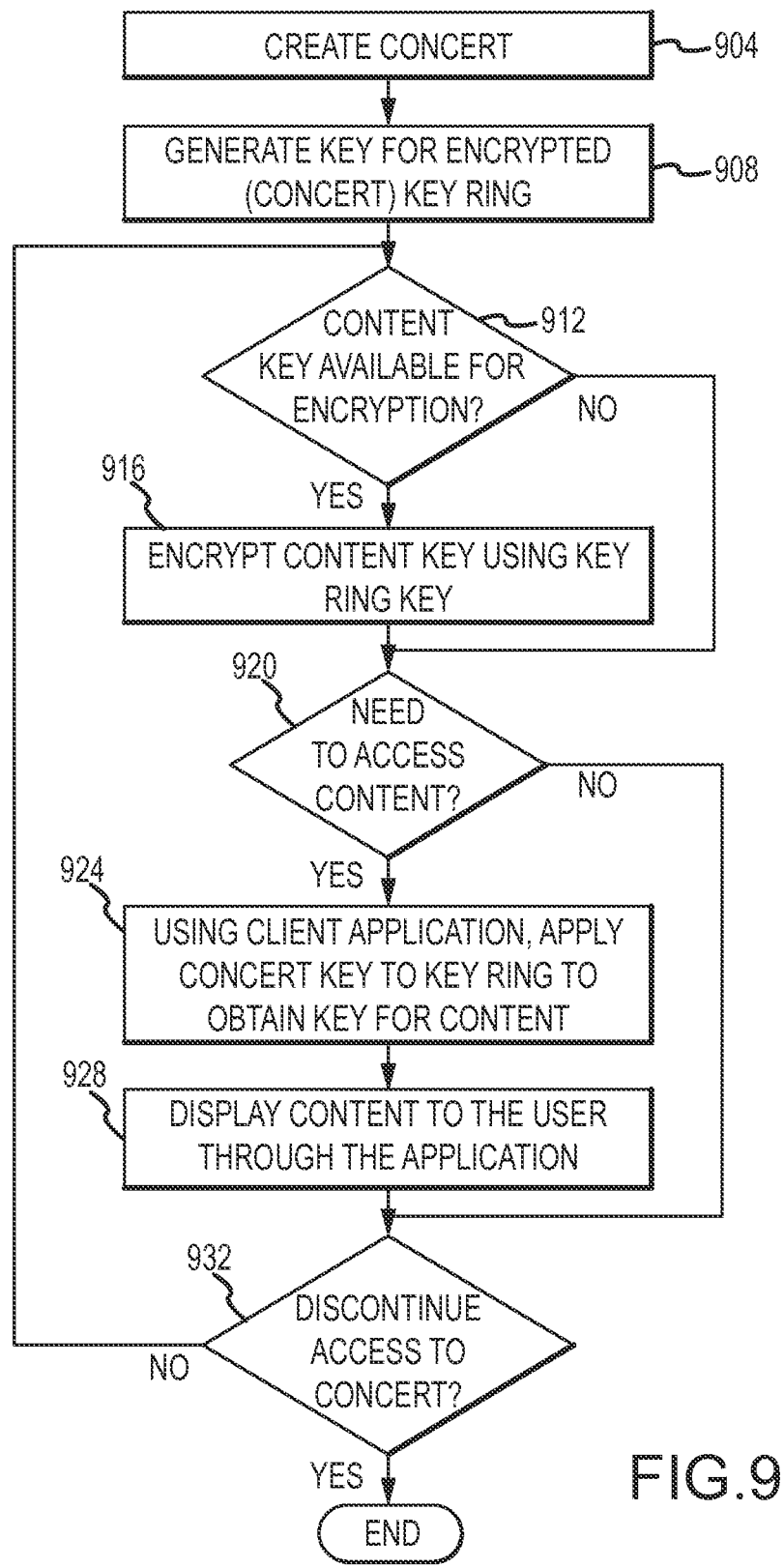
FIG. 9 illustrates a process for generating a key for a concert key ring in accordance with embodiments of the present invention.
Figure 10:
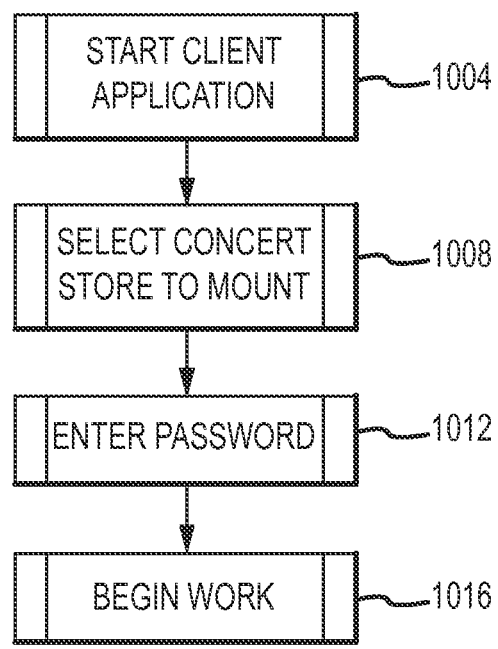
FIGS. 10-13 illustrate different security procedures that may be implemented for accessing content in accordance with embodiments of the present invention.

FIG. 9 illustrates aspects of a process for managing content keys 226. In general, content keys 226 are stored in encrypted key rings that are each associated with a concert or grouping of content 212. Accordingly, at step 904, a concert 212 is created. At step 908, a key for the content (concert) key ring 224 is generated. At step 912, a determination may be made as to whether a content key 226 for a content object 206 associated with the concert 212 is available for encryption. If the content key 226 is available for encryption, that content key 226 is encrypted using the key for the content key ring 224 (i.e., the content key ring 224 for the applicable concert 212) (step 916).

At step 920, a determination may be made as to whether there is a need to access a content object 206 included in a concert 212. If there is a need to access content 206, the necessary system key 234 is applied to obtain the content key 226 for the required content from the content key ring that includes that content key 226 (step 924). Application of the system key 234 can include the client application 204 using the private key 230 to access the system key 234. The content 206 can then be displayed to the user through the client application 204 (step 928). At step 932, a determination may be made as to whether access to the concert 212 should be discontinued. If access is continued, the process returns to step 912. Alternatively, the process may end.

FIGS. 10-13 illustrate different security procedures that may be implemented for accessing content stored as part of an object store 208 and associated with one or more concerts 212 in accordance with embodiments of the present invention. A first level of security is implemented by the process illustrated in FIG. 10. According to that process, the client application or concert application 204 is started (step 1004). The concert store or concert 212 to mount is then selected (step 1008), and a password for that concert store is entered (step 1012). Upon entry of the password, the content 206 can be accessed, and work on that content begun (step 1016).

Figure 11:
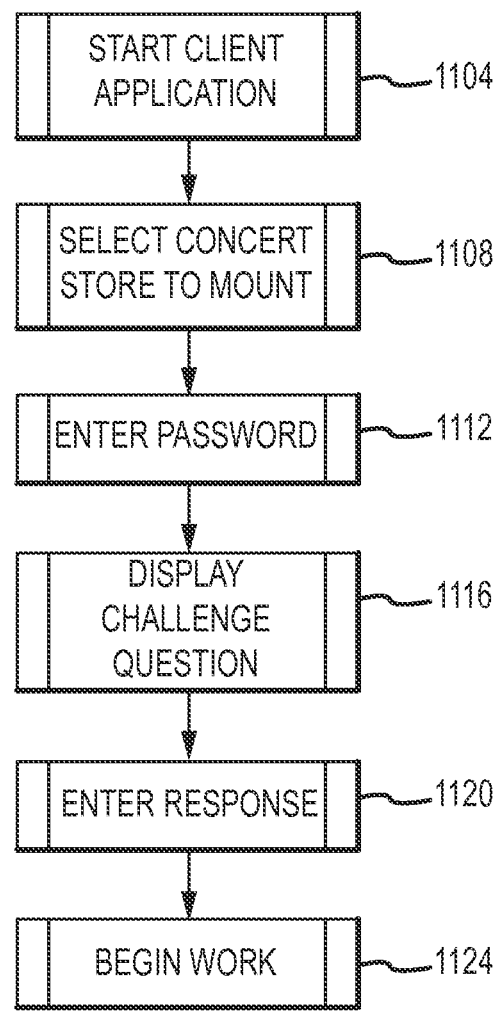

In FIG. 11, a next level of security is illustrated. Initially, the client application or concert application 204 is started (step 1104), the concert store to mount is selected (step 1108), and the required password is entered by the user (step 1112). Accordingly, steps 1104 through 1112 generally correspond to steps 1004 to 1012. At step 1116, a challenge question is displayed to the user. The user's response is entered at step 1120. If the proper response is entered, the content 206 can be accessed, and work can be begun (step 1124).

Figure 12:
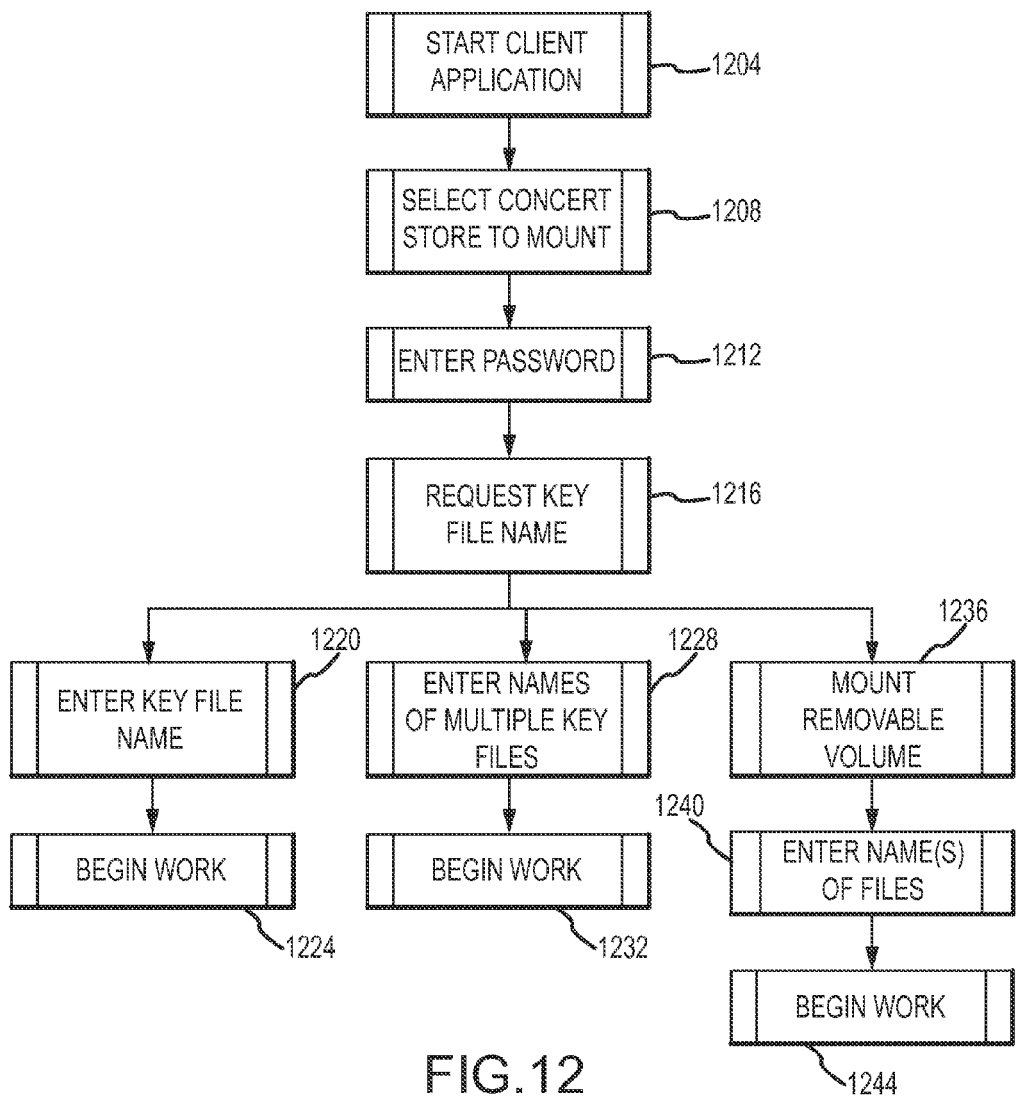

In FIG. 12, a further level of security that can be implemented is illustrated. Initially, at step 1204, the client application or concert application 204 is started, the concert store to mount is selected (step 1208), and the user enters a required password (step 1212). At step 1216, the system requests that the user enter a key file name. Various options may then be implemented. For example, the user may enter the key file name (step 1220) for content 206 immediately accessible to the client device 104, and access to that content may be granted and work begun (step 1224). As an alternative, the user may enter the names of multiple key files (step 1228), and access to that content can be grated and work begun (step 1232). As still another option, after the request for a key file name has been made, the user may mount a removable volume (step 1236) and then enter the name of the key file or files for the desired content (step 1240). Access to the desired content 206 can then be granted, and work begun (step 1244).

Figure 13:
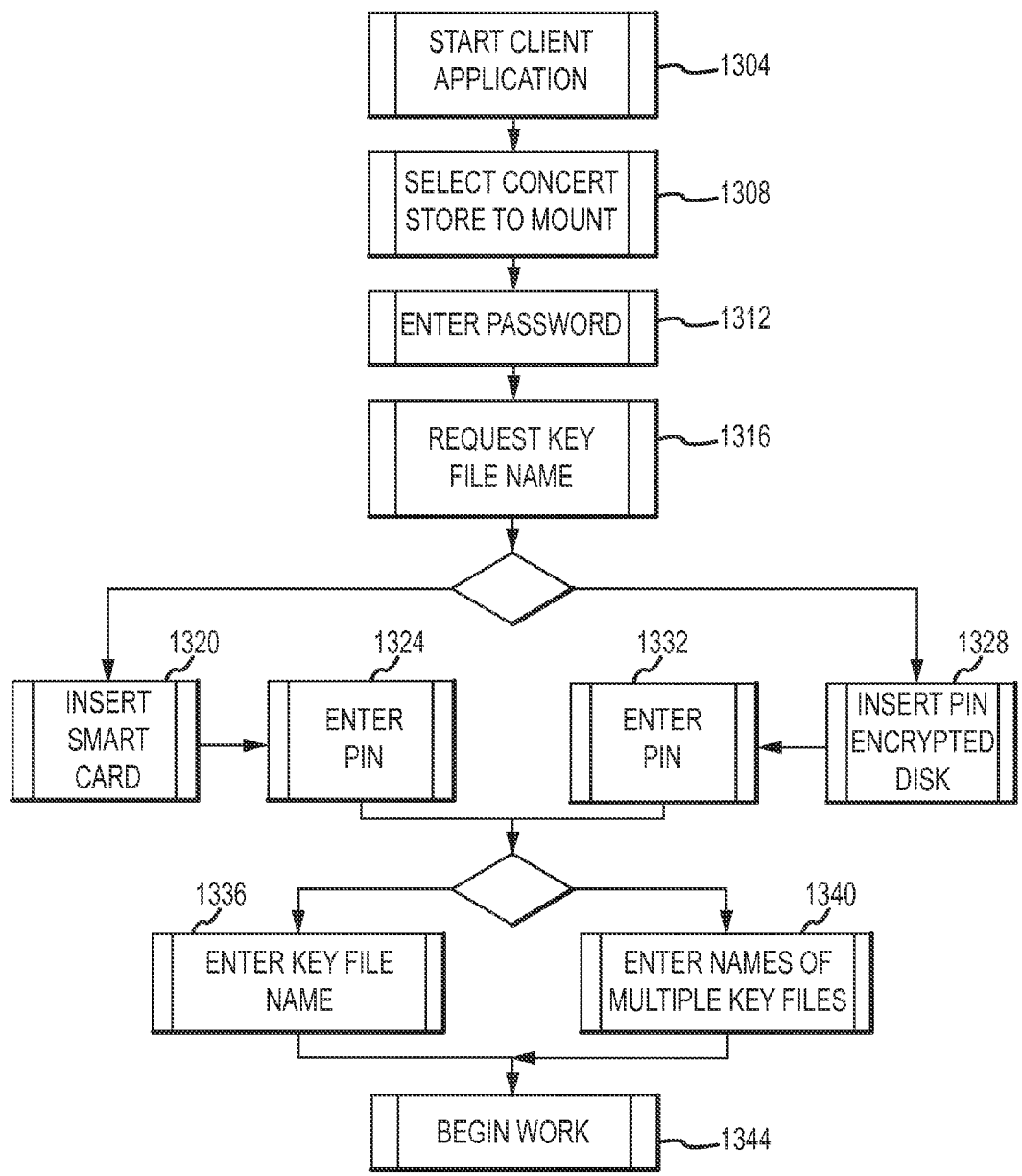
Figure 14:
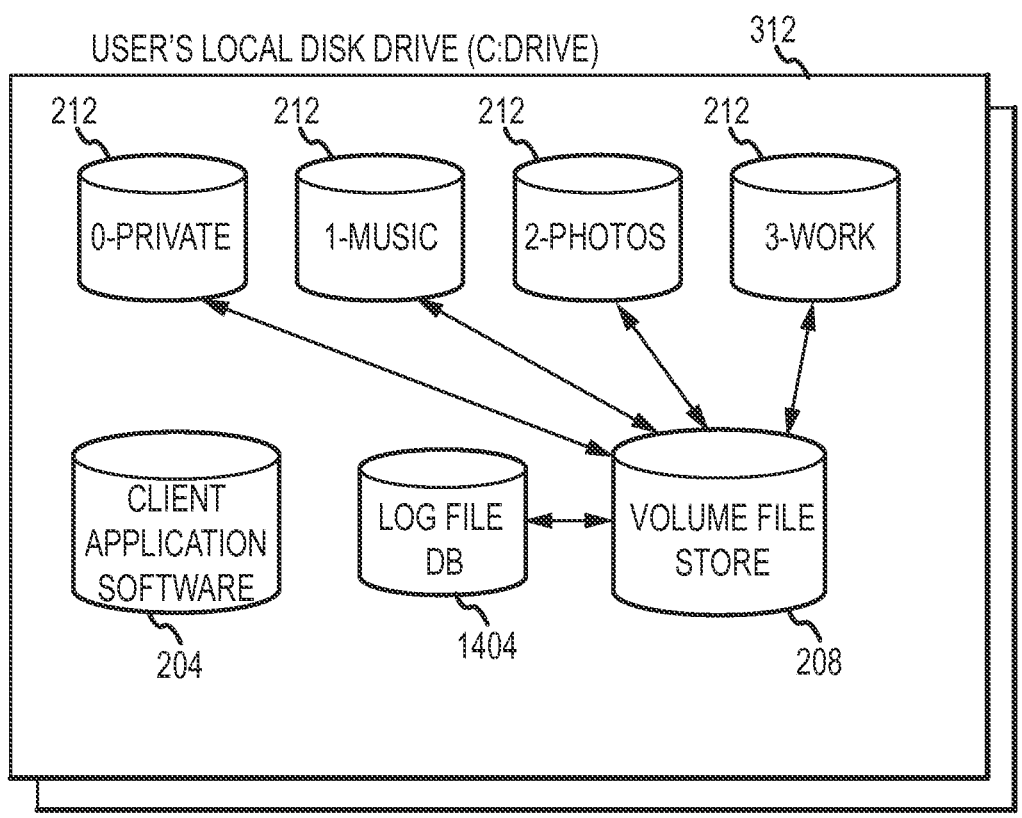
FIGS. 14-18 illustrate different options for storing concert information in accordance with embodiments of the present invention.

In FIG. 13, a further level of security is implemented. Initially, at step 1304, the client application or concert application 204 is started, the concert store to mount is selected (step 1308) and the user enters a required password (step 1312). At step 1316, the client application 204 requests that the user enter the key file name for the requested content 206. In response to the request, different procedures may be supported. For example, the user may insert a smart card (step 1320) containing a key or other required information. In addition, the user may then enter a personal identification number or password (step 1324). As an alternative, in response to the request for a key file name, the user may insert a PIN encrypted disk (step 1328), and additionally enter the PIN (step 1332). After entering the PIN at steps 1324 or 1332, the user may enter the required key file name (step 1336) or the names of multiple key files (step 1340). The desired content 206 can then be accessed, and work begun (step 1344).

FIGS. 14-18 illustrate different options for storing concert information. More particularly, in FIG. 14, data storage 312 that is local to the client system 104 can contain all of the object data in an object or volume file store 208, concert object metadata and keys in associated concerts 212, a log file database 1404, and the client application 204.

Figure 15:
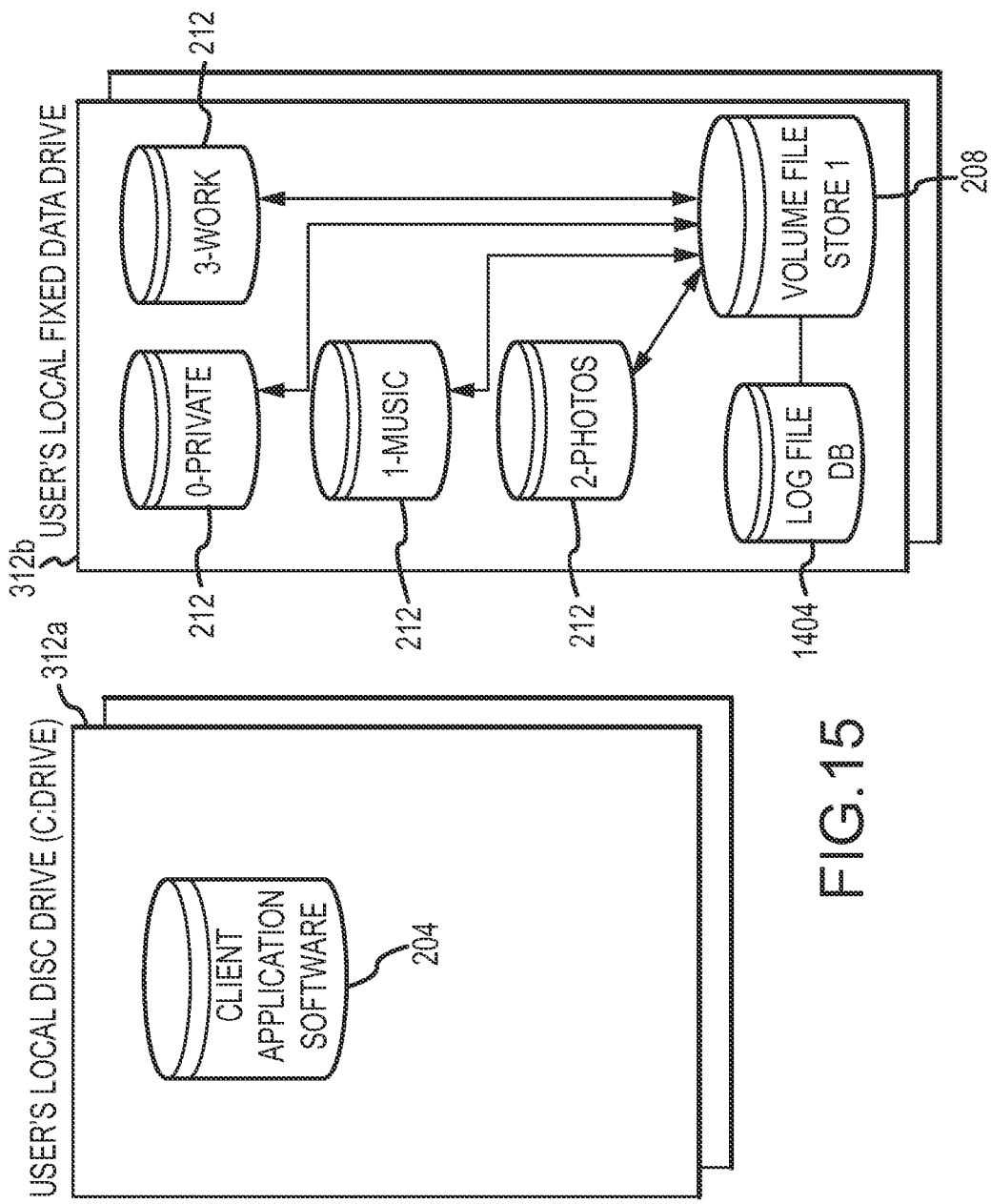

In FIG. 15, the object store 208, concerts 212, and a log file database 1404 are stored on data storage 312*b* comprising a second data drive that is separate from a first data device comprising the data storage 312*a* on which the client application 204 is stored. For example, the first data drive may comprise a first hard disk drive or flash drive that is internal to the client device 104, while the second data drive may comprise a second hard disk drive or flash drive that is also internal to the client device 104. For example, the object store 208, concerts 212, and log file database 1404 may be stored on a second internal hard drive provided as part of the client device 104. In accordance with embodiments of the present invention, the log file data base 1404 can contain a record indicating the concerts 212 that particular content objects 206 are shared with, version information, or other information related to the organization and maintenance of content 206 within the concerts 212.

Figure 16:
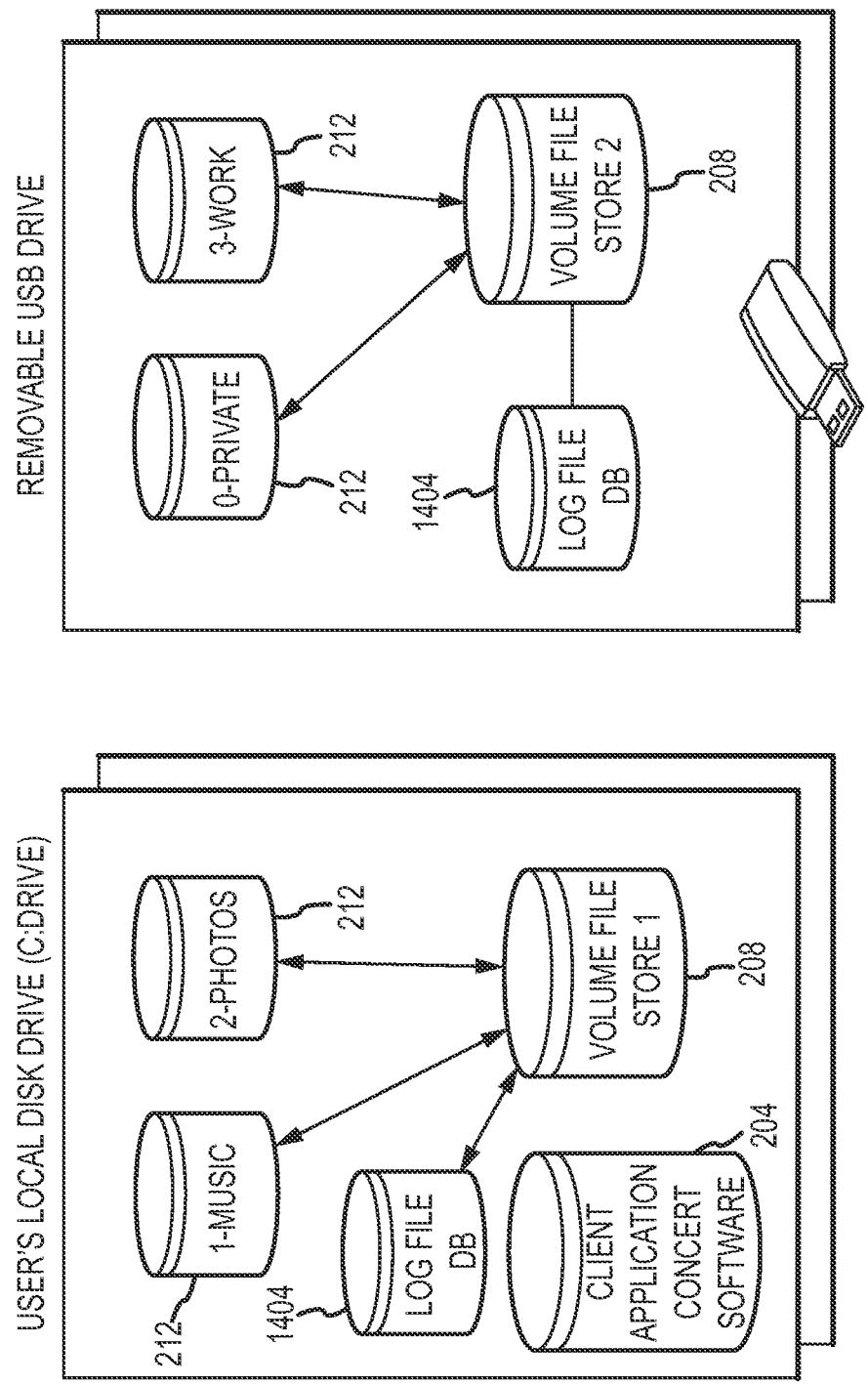

In FIG. 16, an object store 208, concerts 212, and a log file database 1404 are stored on data storage 312 comprising a local disk drive of a client device 104, together with the client application 204. In addition, a second object store 208, other concerts 212, and a log file database 1404 associated with those other concerts 212 are stored on data storage 336 comprising a removable USB drive.

Figure 17:
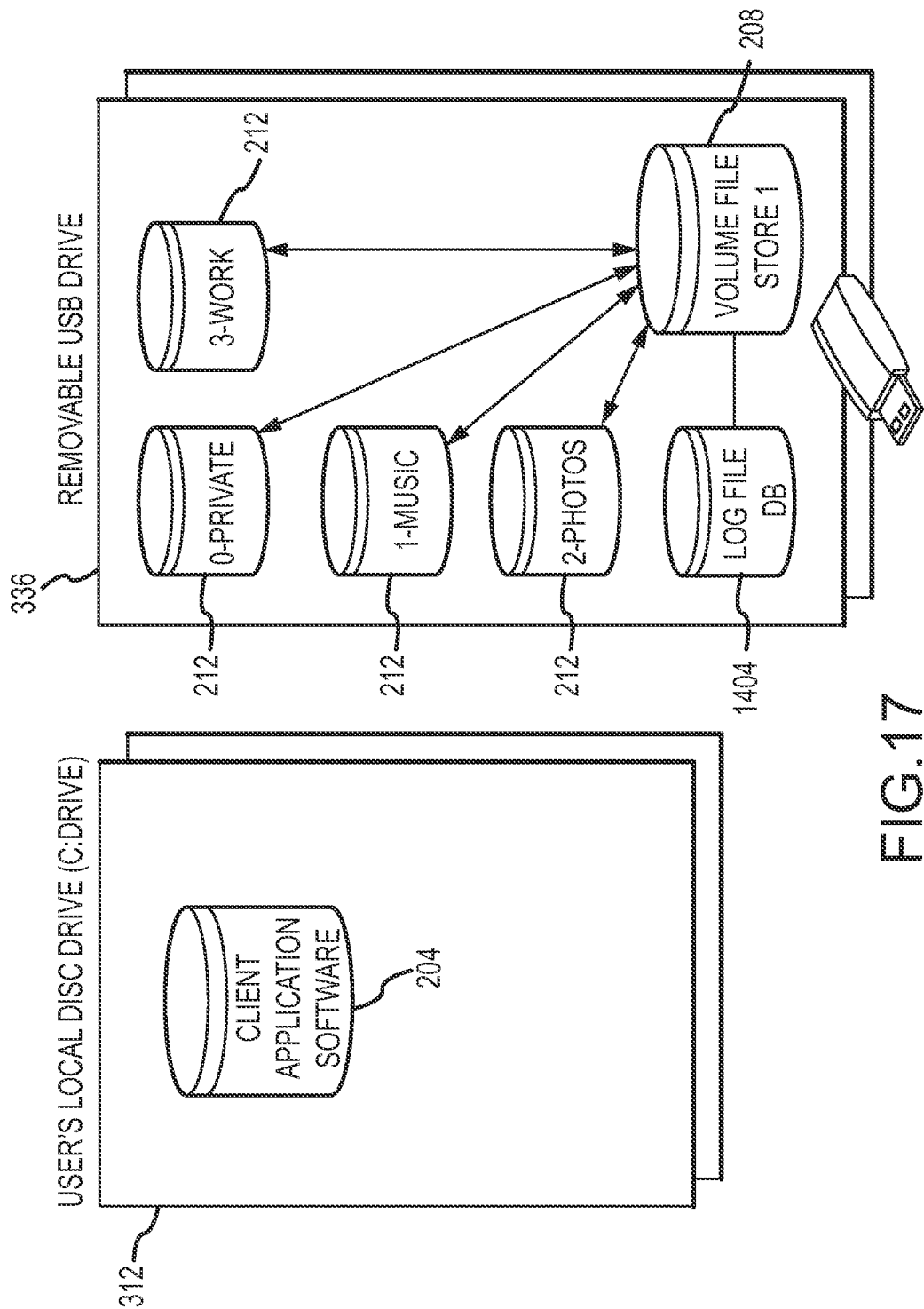

In FIG. 17, the client application 204 is stored on data storage 212 comprising a local disk drive of a client device 104. The object store 208, concerts 212, and log file database 1404 are all on data storage 336 comprising a removable USB drive.

Figure 18:
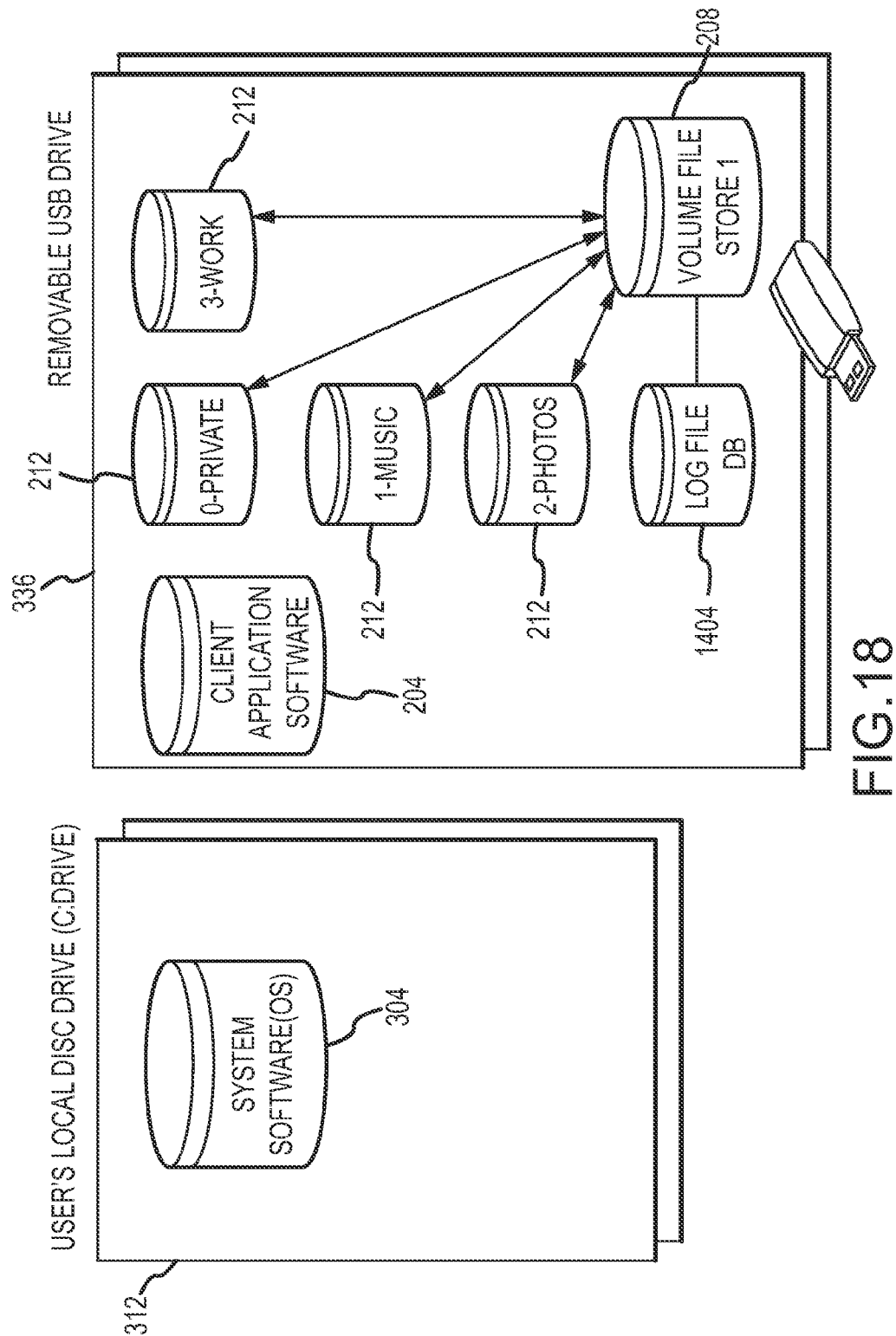

In FIG. 18, data storage 212 comprising a local disk drive of the client device 104 contains operating system software 304, but does not contain the client application 204, an object store 208, or concerts 212. Instead, those components are all stored on data storage 336 comprising a removable USB drive.

Figure 19:
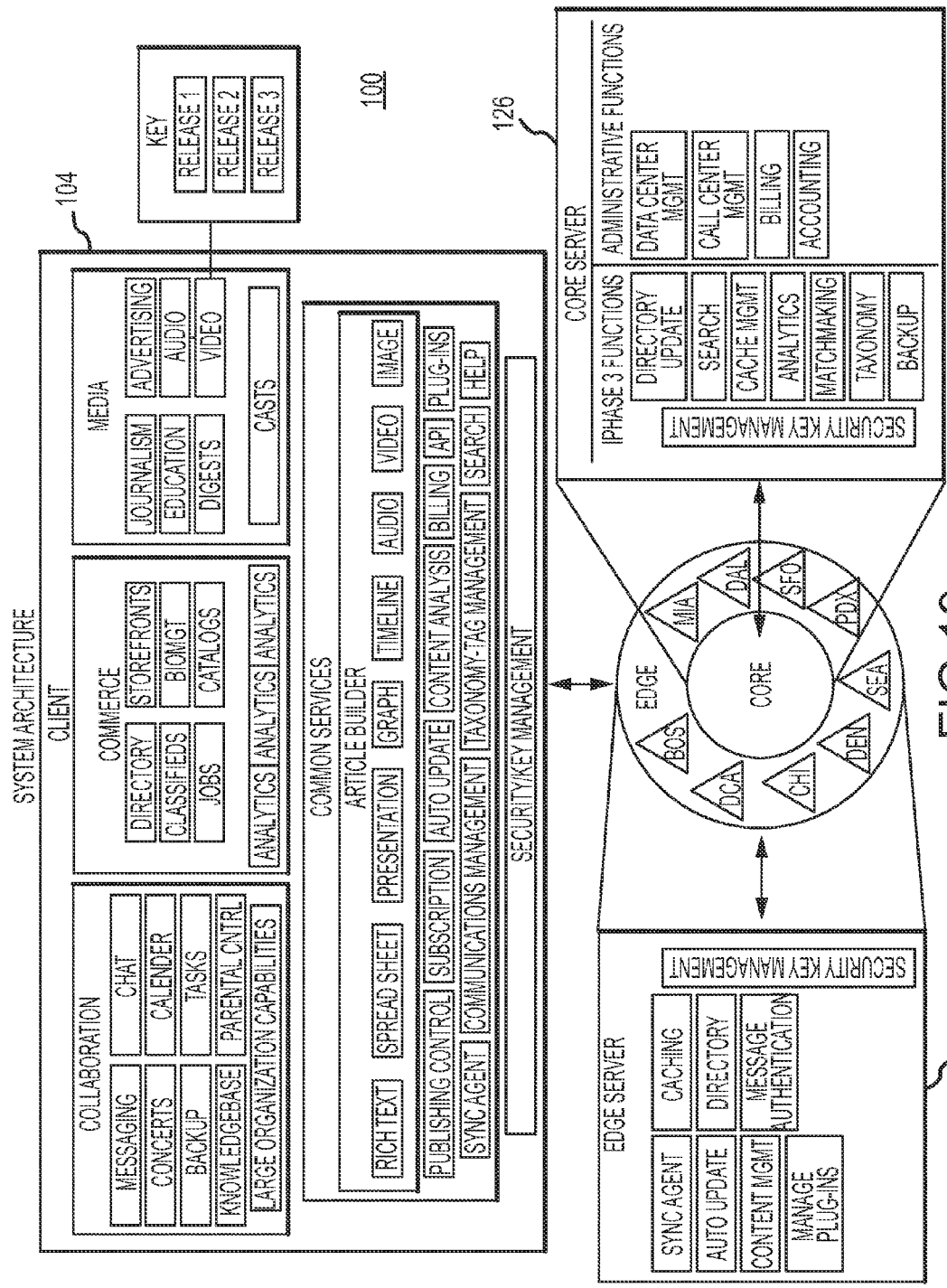
FIG. 19 illustrates an example system architecture in accordance with embodiments of the present invention.

FIG. 19 illustrates an example system 100 architecture in accordance with embodiments of the present invention. In particular, the content system server 108 can be implemented as a core server 126 operating in cooperation with a plurality of edge servers 124. The core server 126 can implement various content distribution functions, including security and key management, directory update, search, cache management, analytics, match making, taxonomy and backup functions. In addition, the core server 126 can perform various administrative functions, such as data center management, call center management, billing and accounting. The edge servers 124 can also provide security and key management. In addition, edge servers 124 can implement synchronization agents, auto updates, content management, manage plug-ins, caching, directory and message authentication. Client devices 104 included in the system 100 implement security and key management. In addition, collaboration, commerce, media and article builder functions and services can be supported. Moreover, different content and functionality can be accessed through different modules and services.

Figure 20:
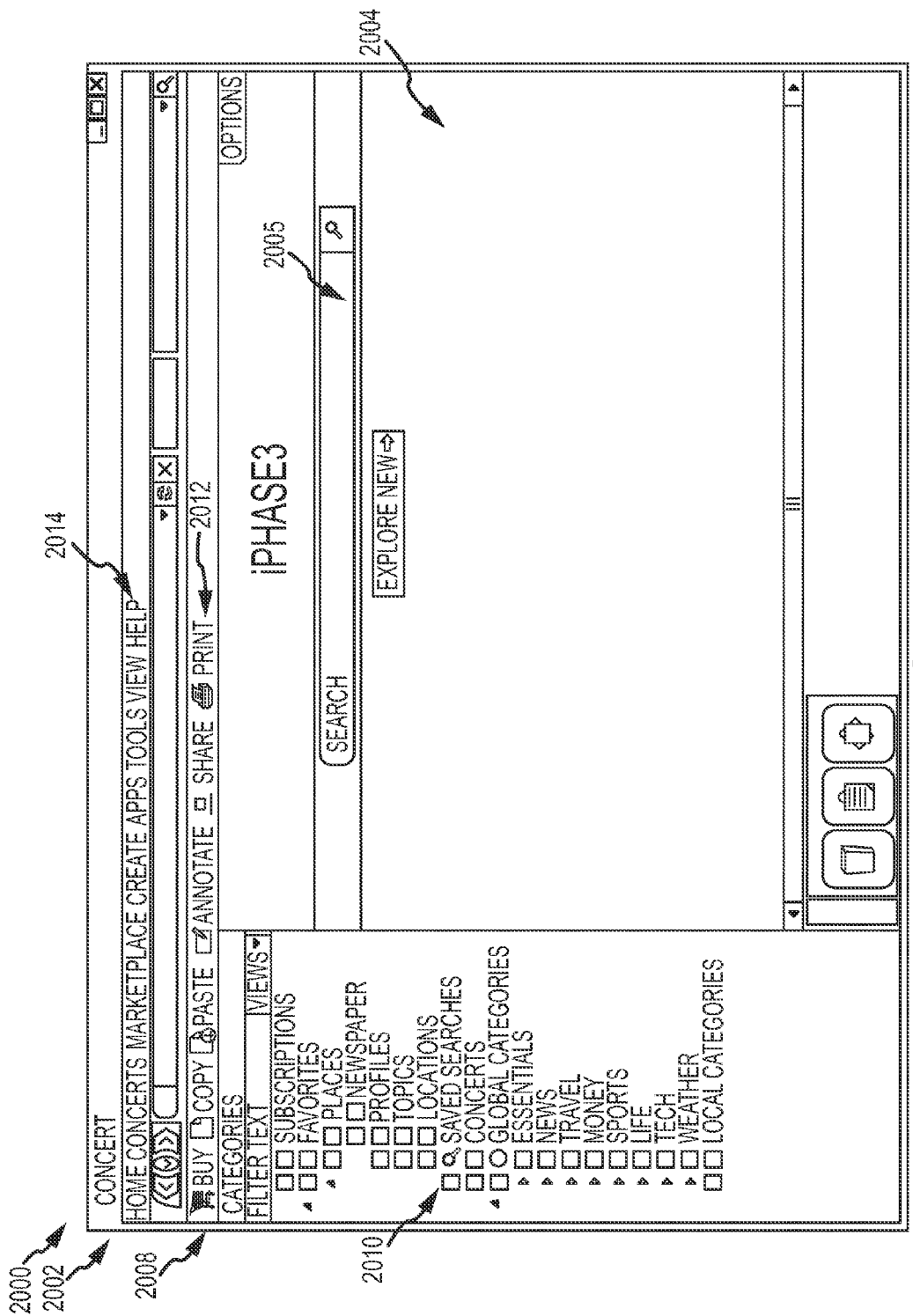
FIG. 20 is an example of a user interface in accordance with embodiments of the present invention.

FIG. 20 illustrates an embodiment of a user interface 2000 that may be presented to a user, for example by a display included in or associated with a client device 104. The user interface 2000 and other user interfaces described herein may be visual display presented in a window on a user's display device. In some embodiments, the client application 204 renders the user interfaces for display and receives user input through one or more user input devices (e.g., selectable buttons, menus, icons, etc.). However, in other embodiments, the content system server 108 may render the user interfaces as multimedia document sent to the client 104 and displayed as a document in the client application 204. Further, selections by the user in the multimedia document may cause the generation of requests that are sent to the content system server 108 from the client 104.

The user interface 2000 provides a window 2002 that can be a first information window for the client application 204. The window 2002 can include a display area 2004 for displaying content 206. In addition, a search field 2006 can be included through which a user can search for content. Further, the window 2002 can include a second display area 2008 that can display a set of user-selectable folders 2010 that organize the user's content. The window 2002 can include further user-selectable devices (e.g., the menu bar 2012 or menus 2014) for receiving user selections.

Although certain examples provided herein discuss the encryption of and operations related to content 206 comprising documents, embodiments of the present invention are not limited to use in association with documents. Instead, any form of content, information, data or the like capable of being stored on and exchanged by computers or like devices can comprise content for purposes of the present disclosure.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for distributing content, comprising:
creating first content on a first device;
encrypting the first content using a first content key; storing the encrypted first content on the first device;
identifying a first recipient for the first content;
encrypting the encrypted first content, the first content key, and first information related to the first content using a public key of the first recipient;
delivering the encrypted first content, first content key, and at least first information related to the first content to a second device, as encrypted using the public key of the first recipient, over a communication network;
receiving the encrypted first content, first content key, and at least first information related to the first content, as encrypted using the public key of the first recipient, at the second device;
decrypting the encrypted first content, first content key, and at least first information related to the first content, as encrypted using the public key of the first recipient, by applying a private key of the first recipient using a client application running on the second device;
storing the encrypted first content in an object store on the second device;
storing the encrypted at least first information related to the first content in the object store on the second device;
storing the first content key in a first key ring on the second device, wherein the first key ring is encrypted using a first system key;
applying the first system key to the encrypted first key ring using the client application running on the second device to access the first content key;
using the unencrypted first content key, the first client application decrypting the encrypted first content to access the first content;
displaying by the client application the first content, wherein actions that a user takes with respect to the first content are limited by permissions associated with the first content; and
after using the unencrypted first content key to decrypt the encrypted first content, overwriting the unencrypted first content key in memory.

2. The method of claim 1, further comprising:
creating second content on the first device;
encrypting the second content using a second content key.

3. The method of claim 1, further comprising:
displaying the at least first information related to the first content on the second device using the client application.

4. The method of claim 1, further comprising:
receiving a first system decryption key at the second device.

5. The method of claim 4, further comprising:
applying the first content key to the encrypted first content using the client application programming and the first system decryption key on the second device, wherein displaying by client application the first content includes displaying the first content on the second device.

6. The method of claim 1,
wherein the encrypted first content is delivered to the second device through a content system server.

7. A system for distributing content, comprising:
a first device;
a first client application running on the first device;
first data storage associated with the first device;
a first encrypted document stored in an object store on the first data storage of the first device;
first encrypted information related to the first encrypted document stored in the object store on the first data storage of the first device;
an encrypted first content key for decrypting the first encrypted document stored as part of a first content key ring on the first data storage of the first device,
wherein a first system key is required to be applied by the first client application to decrypt the encrypted first content key and to thereby access the first content key,
wherein the first client application enables the first content key to be used to decrypt the first encrypted document,
wherein the first content key for decrypting the first encrypted document stored as part of the first content key ring cannot be directly accessed by a user of the first device, and
wherein a first private key must be applied in order to access each of the first encrypted document, the first encrypted information related to the first encrypted document, and the first encrypted content key, wherein the first system key must be applied by the first application to access and decrypt the first encrypted content key, wherein the first encrypted document is unencrypted and displayed by the first client application after the unencrypted first content key is applied by the first client application to decrypt the encrypted first document, wherein actions that user takes with respect to the first document are limited according to permission associated with the first document, and wherein the unencrypted first content key in memory is overwritten.

8. The system of claim 7, further comprising:
a display associated with the first device, wherein the first encrypted document is presented on the display through the first client application using the first content key to decrypt the first document.

9. The system of claim 8, wherein at least some of the first encrypted information related to the first encrypted document is presented on the display without application of the first content key to the first encrypted information.

10. The system of claim 7, further comprising:
a communication network;
a first communication interface on the first client device, wherein the first communication interface is operably interconnected to the communication network, and wherein the first device is operable to create a document package for delivery over the communication network, the document package including the first encrypted document, and the first content key to be used to decrypt the first document, wherein at least the first content key is encrypted by a first recipient public key.

11. The system of claim 10, further comprising:
second data storage associated with the first device, wherein the client application is stored on the second data storage.

12. The system of claim 10, further comprising:
a second device;
a client application running on the second device;
first data storage associated with the second device;
a first encrypted document stored on the first data storage of the second device;
a first content key for decrypting the first encrypted document stored as part of a first content key ring on the first data storage of the second device, wherein the client application on the second device enables the first content key to be used to decrypt the first encrypted document, and wherein the first content key for decrypting the first encrypted document stored as part of the first content key ring cannot be accessed by a user of the second device.

13. A method for distributing content, comprising:
receiving a first data wrapper containing first encrypted content at a first computer, a first content key, and at least first information related to the first encrypted content;
applying using first computer programming running on the first computer a first user key to the first data wrapper, wherein the first encrypted content is removed from the first data wrapper and stored in an object store in encrypted form, wherein the first content key is stored in a key ring in encrypted form as an encrypted first content key and wherein the information related to the first encrypted content is stored in the object store in encrypted form;
applying using the first computer programming running on the first computer a first system key to the encrypted first content key to thereby obtain the first content key;
applying using the first computer programming running on the first computer the first content key to the first encrypted content, wherein the first encrypted content is decrypted to form first decrypted content;
displaying using the first computer programming the first decrypted content, wherein actions a user takes with respect to the first decrypted content are limited according to the permissions associated with the first decrypted content; and
overwriting the first content key in memory.

14. The method of claim 13, wherein the first decrypted content is available to a user of the first computer through a first client application.

15. The method of claim 13, wherein a first client application controls access to the first decrypted content.

16. The method of claim 15, wherein access to the first decrypted content includes at least one of: viewing the first decrypted content, forwarding the first decrypted content, modifying the first decrypted content, excerpting from the decrypted content.

17. The method of claim 13, wherein the first data wrapper additionally includes content metadata, wherein at least some of the content metadata is accessible subsequent to applying a first permission key to the wrapper, and prior to applying the first content key to the first encrypted content.

18. The method of claim 13,
wherein the first content key is received at the first computer when the first data wrapper is received at the first computer.

19. The method of claim 13, further comprising:
forwarding the first encrypted content from the first computer to a second computer in a second data wrapper, wherein the first content key is not included in the contents of the second data wrapper;
receiving at the second computer a third data wrapper, wherein the third data wrapper contains the first content key, and wherein the third data wrapper is provided to the second computer by a content system server.

20. The system of claim 7, wherein the first system key is required to open each of the first encrypted document, the first encrypted information related to the first encrypted document, and the encrypted first content key.

* * * * *